Aug. 28, 1945.   W. H. SILVER   2,383,689
TWO-WAY PLOW
Filed Jan. 31, 1942   4 Sheets-Sheet 1

INVENTOR
WALTER H. SILVER

ATTORNEYS

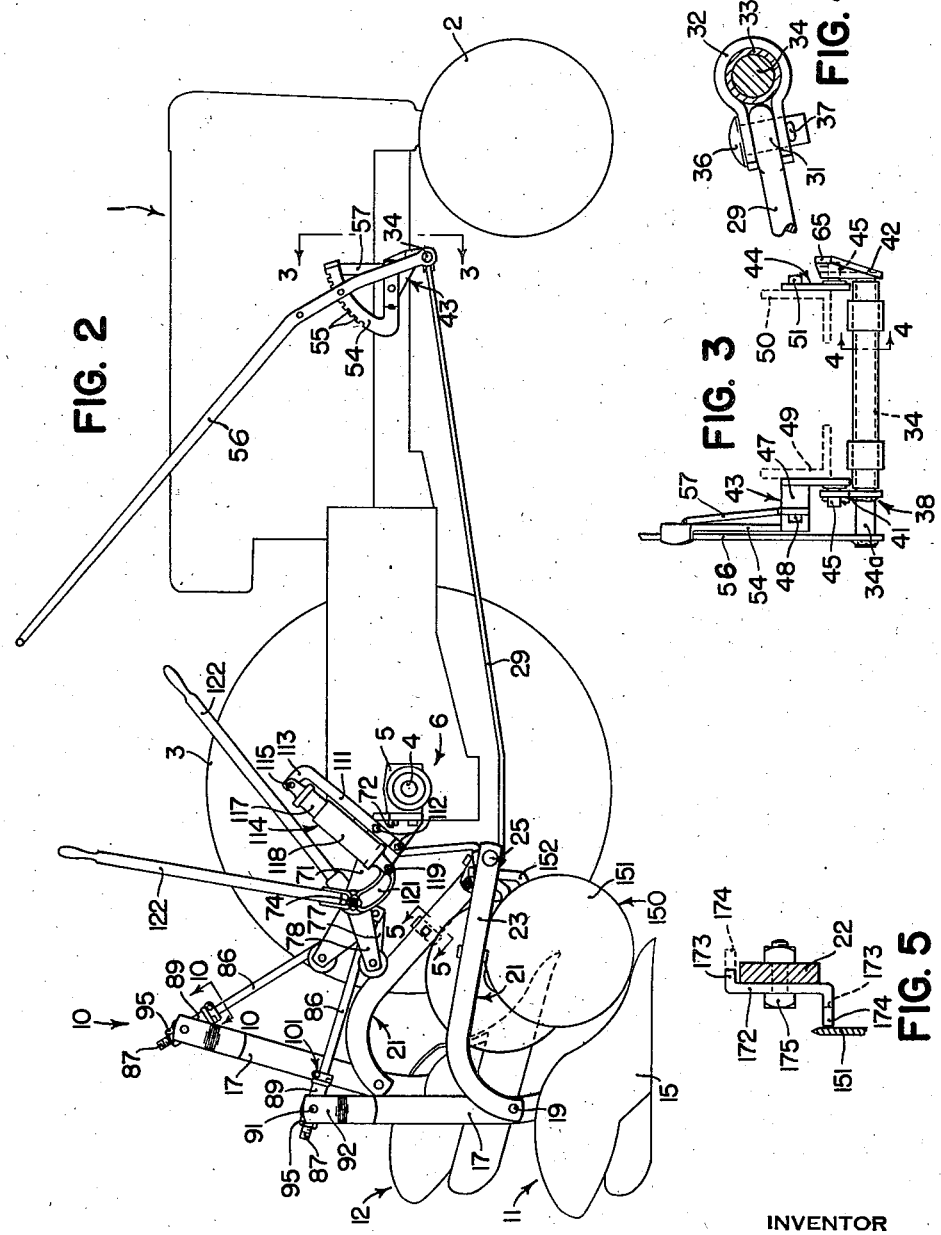

Aug. 28, 1945.  W. H. SILVER  2,383,689
TWO-WAY PLOW
Filed Jan. 31, 1942  4 Sheets-Sheet 3
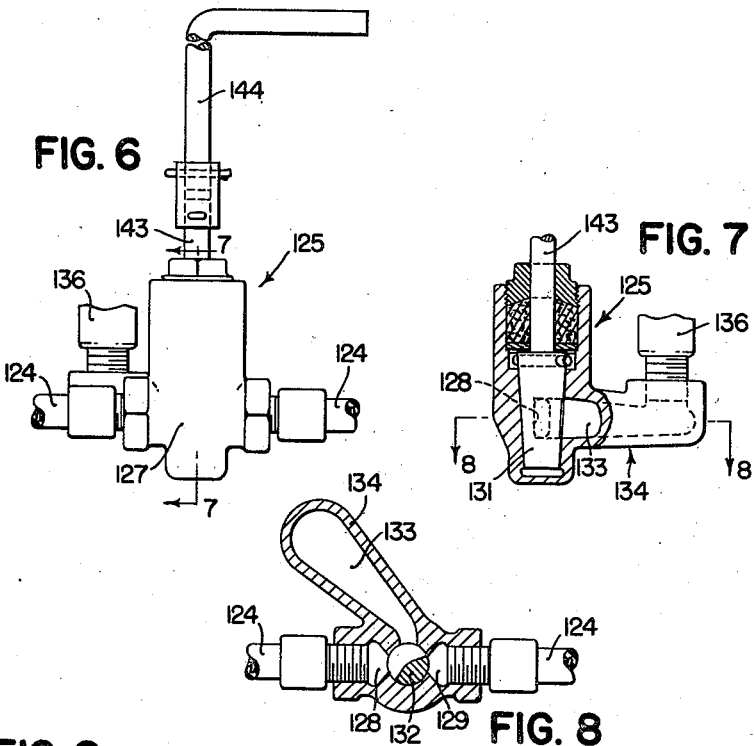
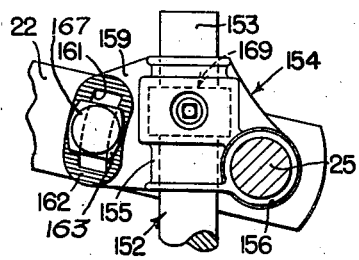
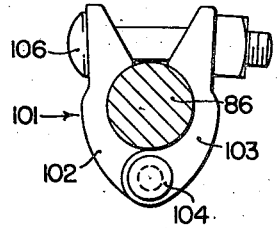
INVENTOR
WALTER H. SILVER
BY
ATTORNEYS Aug. 28, 1945.   W. H. SILVER   2,383,689
TWO-WAY PLOW
Filed Jan. 31, 1942   4 Sheets-Sheet 4
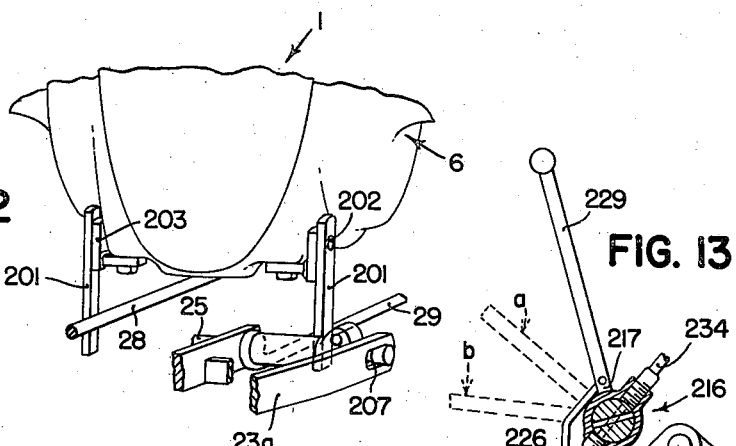
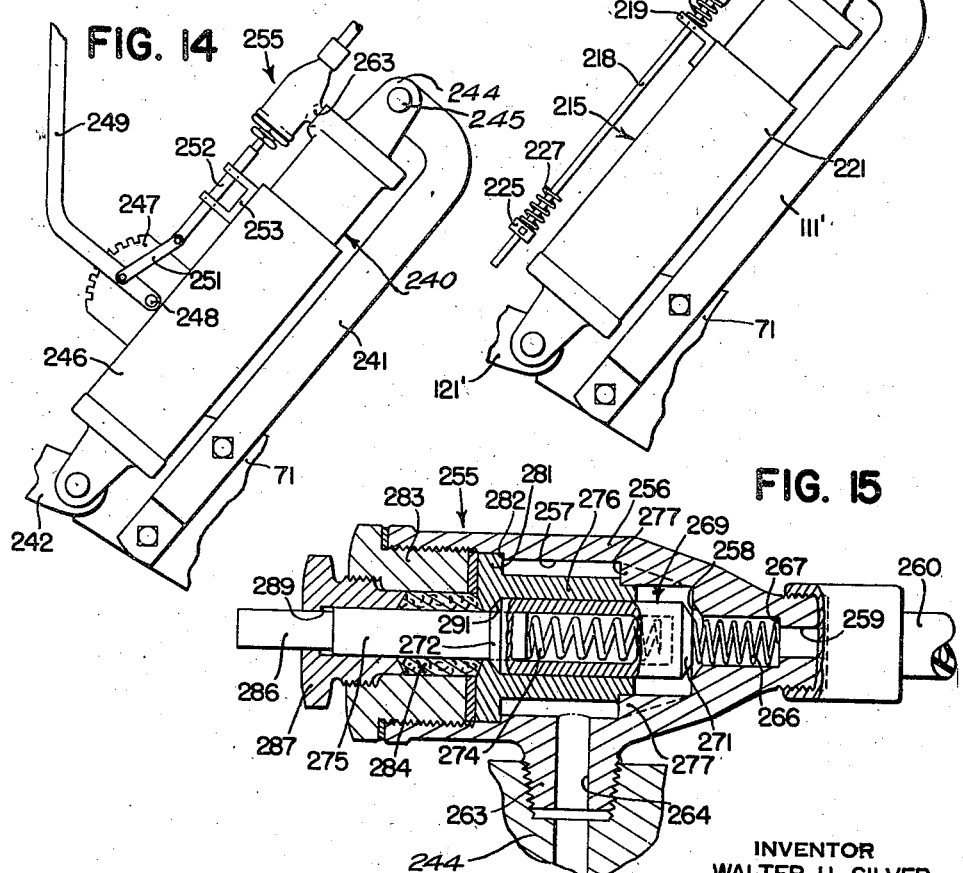
INVENTOR
WALTER H. SILVER
BY
ATTORNEYS Patented Aug. 28, 1945

2,383,689

UNITED STATES PATENT OFFICE 2,383,689

TWO-WAY PLOW

Walter H. Silver, Moline, Ill., assignor to Deere & Company, Moline, Ill., a corporation of Illinois Application January 31, 1942, Serial No. 429,053

23 Claims. (Cl. 97—29)

The present invention relates generally to agricultural implements and more particularly to two-way plows of the integral tractor-carried type. More particularly, the present invention relates to improvements in the type of implement shown in my prior patent 2,249,861, dated July 22, 1941.

The object and general nature of the present invention is the provision of new and improved draft and lifting connections for the right and left hand units of a two-way plow, wherein the plow is hitched well forward on the tractor with long draft transmitting members that attach to a depth adjusting unit carried on the tractor just behind the front tractor wheels. Another important feature of this invention is the provision of adjustable leveling means that is particularly constructed to adapt the implement for hillside work.

Another feature of this invention is the provision of improved means controlling the lateral position of the working unit and still further, another important feature of this invention is the provision of an improved colter mounting accommodating the necessary adjustments and providing ample clearance between the plowing units and the lower portion of the tractor.

An additional feature of this invention is the provision of improved lifting mechanism, one form of which is provided with automatic cut-off means for the individual plowing units, the improved lifting mechanism including hydraulic mechanism in which is incorporated means for facilitating the lowering of either unit to its operating depth without undue delay.

These and other objects and advantages of the present invention will be apparent to those skilled in the art after a consideration of the following detailed description, taken in conjunction with the accompanying drawings.

In the drawings:

Figure 2 is a side view of the implement shown in Figure 1, the tractor being indicated in full lines and the near rear wheel being removed in order to show the parts to better advantage;

Figure 3 is an enlarged fragmentary sectional view taken along the line 3—3 of Figure 2;

Figure 4 is a fragmentary sectional view taken along the line 4—4 of Figure 3;

Figure 5 is a section taken along the line 5—5 of Figure 2;

Figure 6 is a side view of the two-way selecting valve;

Figure 7 is a section taken generally along the line 7—7 of Figure 6;

Figure 8 is a section taken generally along the line 8—8 of Figure 7;

Figure 9 is a side view of the colter mounting;

Figure 10 is a section taken along the line 10—10 of Figure 2, showing the safety release clamp;

Figure 11 is a fragmentary side view, showing one of the adjustable leveling arms;

Figure 12 is a modified form of the present invention in which depending pivoted links are employed for limiting the lateral movement of the bottoms;

Figure 13 is a side view of a modified form of the present invention in which each piston and cylinder unit is provided with a valve that automatically terminates the raising and lowering movement of the unit associated therewith; and Figures 14 and 15 show another modified form of the invention in which the lowering movement only is automatically controlled.

Figure 1:
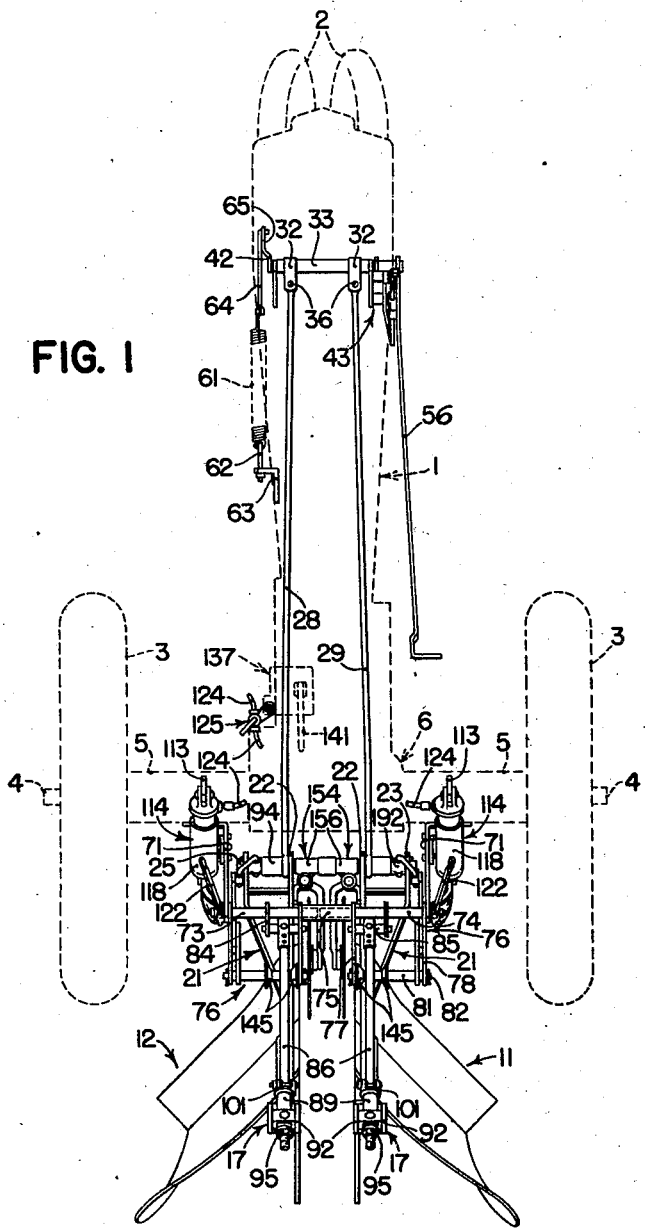
Figure 1 is a plan view of an implement in which the principles of the present invention have been incorporated, the position of the tractor upon which the implement is mounted being indicated in dotted lines.
Figure 1:

Referring now to the drawings, more particularly to Figures 1 and 2, the tractor is indicated in its entirety by the reference numeral 1 and includes a pair of closely spaced front wheels 2 and a pair of wide spaced rear traction wheels 3 mounted on axle shafts 4 that are carried in extensions 5 forming a part of the rear axle structure 6. The latter is secured to or forms a part of the frame of the tractor. Each of the rear axle housing extensions is provided with attaching studs or the like adapted to receive various implement parts as will be referred to later.

The two-way plow forming the subject matter of the present invention is indicated in its entirety by the reference numeral 10 and includes a right hand unit 11 and a left hand unit 12. Generally speaking, the right and left hand units have identical parts except that some of them are right hand while others are left hand, and therefore a detailed description of one of the units will suffice.

Referring first to the right hand unit 11, the furrow opener is shown as a moldboard plow bottom 15, the frog (not shown) of which is secured in any suitable manner to the lower end of a generally vertically disposed standard 17 to which is pivoted, at 19 (Figure 2) a plow beam indicated in its entirety by the reference numeral 21. The plow beam 21 comprises a pair of bars 22 and 23 curved at their rear ends to receive the pivot member 19 and formed to diverge outwardly and forwardly (Figure 1). The forward ends of the bars 22 and 23 are apertured to receive the right end of a cross shaft 25 that extends transversely of the tractor from one side to the other. By virtue of the divergent construction of the bars 22, 23 each plow bottom is rigid so far as any lateral deflection with respect to the cross shaft 25 is concerned. Each beam 21 serves as a link pivotally connecting the cross shaft 25 with the standards of the associated right and left hand plow bottoms and each plow bottom is therefore capable of vertical swinging movement with respect to each other and the tractor.

Draft transmitting means connected with the forward portion of the tractor is utilized to connect the right and left hand units to the tractor. Such draft transmitting means comprises a pair of longitudinally extending links 28 and 29 (Figure 1), each having an eye at its rear end through which the cross shaft 25 extends. Preferably, the rear ends of the draft transmitting links 28 and 29 are disposed against the inner beam bar 22 of the two plowing units, as best shown in Figure 1, being held in this position against lateral displacement along the cross shaft 25 by spacers and other parts to which reference will be made below.

As best shown in Figure 2, the draft links 28 and 29 pass under the rear axle 6 of the tractor. The front end of each of the links 28 and 29 is formed with an eye 31 (Figure 4), and a pair of U-shaped clips 32 disposed in laterally spaced relation are secured as by welding or the like to a transverse sleeve 33 that, in turn, is carried on a cross bar 34. The rear ends of each of the clips 32 are apertured to receive a pivot pin 36, each pin passing through the eye 31 of the associated draft link. A cotter 37 holds each pin 36 in place. The cross bar 34 forms a part of a swinging bail construction, indicated in its entirety by the reference numeral 38 and which also includes link members 41 and 42 that are apertured and are supported in depending relation from a pair of brackets 43 and 44, each bracket having a stud 45 swingably receiving the associated link, 41 or 42. The right hand bracket 43, as best shown in Figure 3, is secured by a bolt 46 and a spacer 47 to an angle 49 forming a part of the tractor frame, and the left hand bracket 44 is, in a similar manner, secured to an angle 50 of the tractor by a bolt 51, the studs 45 being welded to the associated bracket plates. The right hand bracket 43 carries or is formed with a sector 54 which is notched, as at 55. At this side of the tractor, the cross bar 34 is extended, as at 34a (Figure 3) and has welded thereto the lower end of a depth adjusting lever 56. The latter carries conventional detent mechanism associated with the sector 54 whereby the lever 56 may be latched in any desired position. The sector 54 is reenforced by a downwardly and inwardly extending brace member 57 connected at its upper end to the notched portion of the sector and at its lower end to an extended portion of the bracket 43 (Figure 3). As best shown in the latter figure, the bail 38 is suspended in such relation that unlatching the hand lever 56 and rocking the same in one direction or the other swings the bail member 38 in such a direction that the cross bar 34 is moved generally longitudinally of the tractor, this movement thus being imparted to the longitudinally extending draft transmitting rods 28 and 29. As will be explained below, this movement is made use of to tilt the points of the furrow openers either up or down and thus adjust the operating depth of the unit in operating position. The draft pull, normally transmitted through the links 28 and 29 is at least partially counterbalanced by a spring 61 (Figure 1), the rear end of which is connected by an adjusting bolt 62 to a bracket 63 fixed to the tractor frame angle 50. The forward end of the spring 61 is connected by a link 64 to an extension 65 formed on or carried by the left hand bail link 42. The relatively long longitudinally extending links 28 and 29 permit a certain amount of lateral swinging movement of the plow bottoms at the rear of the tractor, but because each of the plowing units is rigidly connected, so far as lateral deflection is concerned, with the cross shaft 25, neither of the plow bottoms can move laterally relative to the other, and therefore the lateral position of either plow bottom relative to the tractor controls the lateral position of the associated plow bottom. This feature is important and reference to it will be made below.

Power lift mechanism is supported on the tractor 1 for raising and lowering the plowing units, and such mechanism will now be described. A pair of right and left hand brackets 71 are secured, as by bolts 72, to the attachment lugs on the rear axle housing extensions 5, and the rear ends of the brackets 71 are apertured to receive a pair of axially aligned rock shafts 73 and 74. As best shown in Figure 1, the laterally inner ends of the rock shafts 73 and 74 are supported for movement one with respect to the other in a central sleeve 75 which, if desired, may be secured to one of the shafts. Each of the rock shafts 73 and 74 is provided with a controlling arm 76, each arm consisting of a pair of plates 77 and 78 which at their outer ends carry a sleeve 81 and a pin 82 on which the sleeve 81 is mounted. A short arm section 84 is fixed to the associated rock shaft and, with the associated inner arm 77, carries a member 85 to which the front end of a link 86 is pivoted for lateral movement, the member 85 being capable of pivoting about a transverse axis in the members 77 and 84. The member 86 is in the nature of an upper link, the rear end of which is threaded, as at 87 (Figure 2). The rear end of the link 86 extends through a sleeve 89 that is pivoted by trunnions 91 or the like to the upper end of the plow standard 17, there being hammer straps 92 which, with the main portion of the standard 17, comprises an upper bifurcated section receiving the trunnioned sleeve member 89. A nut 95 is threaded onto the rear end of each link 86 which serves as a limit or stop for the sleeve 89 limiting its movement rearwardly with respect to the associated link 86. A friction clamp 101 is secured to the link 86 against the front end of the sleeve member 89, and is best shown in Figure 10, each clamp 101 consisting of a pair of link-embracing members 102 and 103 pivoted as at 104 to one another and normally held in clamped relation about the link 86 by a bolt 106. Adjusting the positions of the nut 95 and the friction clamp 101 serves to pivot the plow bottom about the point 19 at the rear of the associated plow beam 21 so as to cause the plow bottom to tend to run deeper or more shallow, as may be desired, independent of the depth adjusting mechanism at the front ends of the links 28 and 29. Since each plowing unit is provided with the adjusting means 95, 101 the plows may be arranged to plow at the same depth with any given adjustment of the depth adjusting mechanism at the front of the tractor which, as is clear from Figure 1, is common to both right and left hand units.

Secured to each of the brackets 71 is an upwardly and forwardly extending supporting member 111 which at its lower end is bolted, as at 112, to the associated bracket 71 and at its upper end is provided with an extension 113 to which the upper end of a piston and cylinder unit 114 is connected, as by a pivot bolt 115. The ram or piston and cylinder unit 114 is of known construction, including a cylinder 117 in which a piston (not shown) moves, there being a piston rod to the outer end of which a telescopic sleeve section 118 is secured. The outer end of the piston is connected by a pivot bolt 119 to an arm 121 which is fixed to the squared outer end of the rock shaft 74, and bolted to the arm 121 is an upwardly extending hand lever 122 disposed adjacent the operator's station on the tractor. The left hand plowing unit 12 is provided with similar mechanism. A hose 124 is connected at its outer end to each of the cylinders 117, the upper or forward ends of the hoses 124 being connected into a two-way valve unit indicated in its entirety by the reference numeral 125. The valve 125 comprises a valve body 127 having two bores 128 and 129 with which the two hoses 124 are in communication. A valve plug 131 is disposed within the valve body 127 and is provided with a port 132 which in one position of the valve serves to open communication between the chamber 128 and an inlet chamber 133 formed in an arm or extension 134 of the valve body. In the other position of the valve plug 131, communication is established between the chamber 129 and the inlet chamber 133. The arm 134 serves as supporting means for the valve 125, being connected by a suitable fitting 136 to the lower end of a valve box 137, as best shown in Figure 1. The mechanism of the controlling valve unit 137 is not shown in detail since this structure is disclosed and claimed in the co-pending application of Jay D. Johnson, Serial No. 398,539, filed June 18, 1941, now U. S. Patent No. 2,340,474, issued February 1, 1944. Briefly, such controlling valve mechanism incorporates a valve handle 141 movable to three positions, namely, an upper position in which fluid under pressure is caused to be directed outwardly from the valve unit 137, a second position in which the fluid is blocked against returning to the sump or reservoir incorporated in the unit 137, and a third position in which a valve is opened to permit oil or other fluid to flow freely back to the unit 137. The valve plug 131 of the present invention includes a stem 143 to which an operating handle 144 is connected in any suitable manner. The valve unit 125 serves as a selecting valve placing one or the other of the ram units 114 in communication with the tractor valve unit 137 to be controlled by the latter while locking fluid in or preventing flow of fluid to the other ram unit, as will be explained more in detail when describing the operation of this implement. As best shown in Figure 2, when the valve units are actuated so as to cause fluid to be delivered under pressure to the ram unit 114 for the right hand unit, the piston section 118 thereof is forced outwardly and downwardly, swinging the arm 21 and the shaft 74 in a clockwise direction. Normally there is a certain amount of clearance between the sleeve 81 (Figure 1) and the link 86, so that the first clockwise movement of the rock shaft 74 causes the arm 82 to shift the link 86 generally rearwardly. This, in effect, tilts the right hand plow bottom about the pivot connection 19, raising the point of the plow bottom with respect to the other portions thereof whereby the continued forward travel of the outfit causes the plow bottom to tend to run out of the ground. As the clockwise movement of the lifting rock shaft 74 continues, the above-mentioned space is taken up and the sleeve 81 comes into engagement with the link 86.

After this, continued rocking movement of the rock shaft 74 acts through the link 86 to raise the bottom 15 bodily into its transport position. Mounted on the sleeve 81 is a pair of conical washers 145 which act against the link 86 to force the unit being raised laterally into a generally central position, as shown in Figure 2, if at the moment the unit is being raised it should happen to be in a more lateral position.

Each of the plowing units 11 and 12 is provided with a colter 150, each colter including a colter disk 151 mounted for rotation on a supporting member 152. The supporting member 152 includes a shank 153 (Figure 9), which is dispersed in a colter shank bracket, indicated in its entirety by the reference numeral 154. The bracket 154 includes a vertical sleeve section 155 receiving the upper part of the colter shank 153 and a second sleeve section 156, disposed at a right angle to the first-mentioned sleeve section 155. The sleeve section 156 is arranged to receive the cross shaft 25 and is disposed laterally outwardly of the rear end of the associated draft transmitting rod 29, as best shown in Figure 1. An extension 159 is formed on each colter shank bracket 154, the extension being slotted, as at 161, and corrugated, as at 162. A companion corrugated washer 163 is disposed against the corrugations of the extension 159. The washer 163 has a square hole to receive the head of a bolt 167, the bolt extending through an opening in the adjacent portion of the plow beam bar 22. By loosening the bolt 167 and changing the position of the colter shank bracket by swinging it about the axis of the cross bar 25, the colter disk 151 may be raised or lowered as desired. Normally, the colter shank is mounted for swinging movement in the sleeve section 155, being held against vertical movement therein by a set screw collar 169 or other suitable means. The colter disk is prevented from swinging laterally into the side of the plow bottom by means of a bracket 172 which is formed, as best shown in Figure 5, with a short abutment section 173 and a long abutment section 174. The bracket 172 is held in place against the associated bar 22 by a bolt 175. The reason for providing two sections 173 and 174 of different lengths is to provide for holding the associated colter disk 151 at different distances from the plow bottom. For example, as shown in Figure 5, a particular plow bottom employed may require that the colter disk 151 be held at such a position from the plow bottom that the use of the longer section 174 is indicated, whereas other plow bottoms may be such that the short section 173 may be used. The bolt 175 may therefore be loosened and the bracket 172 reversed to bring the short section 173 down into a position to limit the colter disk 151, as shown in dotted lines in Figure 5. Each of the plow beam parts 22 is provided with such a colter stop 172 as just described.

The cross shaft 25, in addition to serving as a rigid connection between the front ends of the two plow beams 21, also serves as a part of automatic leveling means which will now be described. Secured to each of the arms 78, which is fixed to the associated rock shaft, is an auxiliary arm 181, the outer or forward end of which is curved and is apertured to receive a pivot block 182. The arm 181 is slotted, as at 183, and a pair of bolts 184 serve to secure the arm 181 to the arm 78. The arm 181 also has a hole 185 so that the arm may be bolted in place with the block 182 close to the shaft 74.

A link 187 has its upper end turned laterally and disposed in an opening in the pivot block 182. The lower end of the link 187 is similarly formed, having a bent end pivotally connected to a block 192 disposed between the bar 23 of the plow beam 22 and a spacer 194 on the cross shaft 25. The arm 181 may be adjusted to bring the outer curved end closer to or further away from the axis of the associated rock shaft. For deep plowing, the arms 181, there being one for each of the plowing units, are adjusted so that when one of the plowing units is lowered into operating position, the resulting swinging movement of the associated lifting arm on the lifting rock shaft raises the link 187 connected therewith through the lifting arm 181, whereby the cross shaft 25 takes a position approximately parallel with the ground surface. If it is desired to plow only at a moderate depth, the leveling arms 181 are adjusted to an intermediate position. If desired, as for hillside work where the furrow slice is to be thrown uphill, the leveling arms 181 may be adjusted so as to bring the pivot blocks 182 quite close to the associated rock shafts, whereby the action of the leveling arms is a minimum, since for hillside work the position of the tractor on the hillside is substantially level, due to the fact that the uphill traction wheel is in the previously opened furrow. In a situation of this kind the plow bottoms are also approximately level, rather than severing the furrow slice on a plane that is parallel to the plane of the hillside. This is satisfactory, however, for the reason that since the furrow slice is to be thrown uphill, the furrow slice may well be thinner at the downhill edge thereof to facilitate depositing the furrow slice uphill.

The operation of the implement described above is substantially as follows.

The normal operating position is as indicated in Figure 2, namely, with one plowing unit in raised position while the other unit is lowered into operating position. The lateral position of the raised unit determines the lateral position of the lowered unit since the conical washers 145 (Figure 1) of the raised unit acts through the rigid beams 21 and the cross shaft 25 to control the lateral position of the lowered unit. The depth of operation of the lowered unit, namely, the right hand unit 11 in Figure 2, is controlled or varied by swinging the hand lever 55 in one direction or the other, thus shifting the draft transmitting links 28 and 29 generally forwardly or rearwardly, as it is desired to decrease or increase the depth of plowing. It is to be noted that swinging the lever 55 from one position to the other tilts both of the bottoms by substantially the same amount, whereby the operating depth of each bottom normally is the same. By virtue of the threaded connection 95 and the adjustable friction collar 101, the tilted position of either plow bottom may be adjusted relative to the other so as to cause both of them to operate at the same depth for a given adjustment of the front depth adjusting means. When the end of the field is reached and it is desired to raise the lowered bottom, the operator first turns the valve handle 144 to select the ram unit 114 of the lowered unit. This movement of the valve plug 132 locks the fluid in the cylinder of the raised unit and at the same time places the cylinder of the lowered unit into communication with the inlet chamber 133. After the operator has thus selected the cylinder of the lowered unit, he then raises the main control valve lever 141. Fluid under pressure is then directed back to the cylinder 114 of the lowered unit, causing the piston 118 thereof to move downwardly and rearwardly, thus rocking the rock shaft 74. As mentioned above, the first movement in this direction does not raise the bottom bodily, but, instead, tilts the point upwardly. Thus, the continued forward travel of the unit tends to cause the plow bottom itself to run out of the ground without actually lifting the bottom. As soon as this movement continues, however, the sleeve 81 engages the link 86 whereupon the arms on the lifting rock shaft 74 act through the link 86 to raise the bottom. At the same time, the forward end of the leveling arm 181 is lowered so that when the bottom is raised to its transport position, alongside the raised left hand unit, the cross shaft 25 is substantially level with the tractor.

After the outfit has been turned around and it is desired to lower the other unit, the operator first turns the valve handle 144 over to the other position. This immediately locks the liquid in the cylinder for the now raised unit and places the cylinder of the unit to be lowered into communication with the chamber 133. Next the operator lowers the valve handle 141 of the main valve unit, which permits fluid to flow from the cylinder of the unit to be lowered back to the reservoir or sump of the main valve unit. In those cases where the weight of the bottom and associated parts is not sufficient to force the oil back into the main valve unit at a sufficiently rapid rate, the operator may, if desired, grasp the hand lever 122 and swing the same forwardly, thus aiding in a prompt evacuation of the fluid from the cylinder. This movement of the hand lever 122 has the further advantage that after the plow bottom engages the ground, forward pressure on the lever 122 exerts a pull on the upper link 86. This tends to tilt the point of the plow downwardly, thus increasing its angle of incidence relative to the ground surface, whereby it tends to run down to the desired depth in a relatively short time.

The manner of adjusting the colter disk stop 172 and the colter shank supporting bracket 154 is described above.

Reference was made above to the function of the friction clamps 101 in holding the associated sleeve members 89 in position at the rear end of the links 86. The provision of these friction clamps 101 has an additional advantage in that they serve as safety releases. Specifically, the members 102 and 103 of the clamp 101 are tightened by the bolt 106 enough to prevent their being forced forwardly along the links 86 under normal conditions. However, if the point of the plow bottom should strike an obstruction, such as a stone, the forward pull transmitted to the plow bottom through the associated draft links and the draft beam 21, tends to cause the upper end of the standard 17 to swing forwardly, and if the forces involved are sufficiently great, the clamp 101 merely slides forwardly, permitting the plow beam affected to tilt upwardly and in most cases clear itself of the obstruction. It is a relatively simple matter then to restore the parts to operative position by completely loosening the bolt 106 and moving it and the sleeve 89 back into the position shown in Figure 2.

In those cases where it might be desired to construct the plow beams 21 of fairly light stock, in which case they may not have the necessary rigidity to permit the lateral position of one plow bottom being controlled by the engagement of the upper link 86 of the other plow bottom in between the conical washers 145, the modified form of construction shown in Figure 12 may be used. In this case a pair of links 201 are swingably mounted as on pivots 202 at their upper ends on brackets 203 and are secured to the tractor in a position adjacent the cross shaft 25. The links 201 extend generally downwardly and are disposed between the draft transmitting links 28 and 29, contacting the latter just forward of the portions thereof disposed about the shaft 25. The brackets 203 are formed so that the links 201 have firm engagement therewith, whereby the links 201, acting through the associated draft links 28 and 29, prevent the cross shaft 25 and the links 28 and 29 from swinging laterally. In this case, however, it is desirable to provide for some lateral movement of each bottom, and to provide this I form a slot 207 in the forward end of the bar 23a of the plow beam, the bar 23a being otherwise identical with the bar 23 described above and shown in Figure 1. By virtue of the slot 207, the desired lateral swinging of the associated plow bottom is secured, each plow bottom swinging in this case relative to the other. In operation, the links 201 may swing backwardly in case they tend to gather trash and the like, such backward swinging movement of the links permitting the trash to clear itself from the links.

In Figure 13 I have shown a modified form of lifting cylinder arrangement that may be substituted for the lifting cylinders 114 and the associated selecting valve or mechanism 125. Referring now to this figure, the reference numeral 215 indicates a ram or piston and cylinder unit of substantially the same construction as indicated in Figure 2, except that in this case a valve 216 is carried by each cylinder and is interposed between the latter and the fluid conducting hose. The valve 216 is of conventional construction having a valve operating arm or lever 217 by which the valve may be moved in either direction from a central position, in which position the valve is open and is in a position to permit the flow of fluid either to the cylinder or from the cylinder, according to the position of the main tractor control valve unit 137. Pivotally connected to the valve lever 217 is an actuating rod 218 extending generally longitudinally of the cylinder unit 215 and passing through and supported on a lug 219 fixed to the sleeve 221 which moves with the piston within the cylinder 215. A pair of set screw collars 225 and 226 is fixed to the rod 218 in spaced apart relation, and adjacent each set screw collar is a spring 227. The valve lever 217 is extended to form a hand lever 229. In this form of the invention there are two units 215 and associated valves 216, one at each side of the tractor and connected in the same manner as the units 114 are connected as shown in Figure 1. A hose 234 leads from each valve 216 directly to the main tractor valve unit 137, there being no two-way valve, such as is shown in Figures 6-8 in this form of the invention.

The operation of the form of the invention just described is substantially as follows.

As soon as it is desired to raise the associated plowing unit from a lowered position to a raised or transport position, the operator moves the hand lever 229 from its full line position into a dotted line position indicated at $a$. This opens the valve 216. Then by operating the main tractor valve unit 137, fluid under pressure is directed from the unit 137 to the cylinder unit 215, causing the piston and sleeve part 221 thereof to move outwardly. This motion continues until the lug 219 is carried into contact with the spring 227 adjacent the stop collar 225. A slight additional movement compresses the spring to a point where the valve lever 217 is swung to the left into a position $b$ closing the valve 216, whereupon the raising movement is automatically terminated and at a point depending upon the position of adjustment of the stop collar 225 on the rod 218.

When it is desired to lower the plowing unit, the hand lever 229 is moved in the other direction from position $b$ back to position $a$, again opening the valve 216. Then by opening the main tractor valve unit 137, the plowing unit associated with the cylinder unit 215 lowers under the action of gravity, aided if necessary by the operator moving the hand lever 122 forwardly. This lowering movement continues until the lug 219 on the sleeve 221 engages and compresses the spring 227 to the point where it moves the valve lever 217 in the other direction again closing the valve 216 and thus terminating the lowering movement at a point depending upon the position of adjustment of the collar 226 on the rod 218.

Thus I have provided a mechanism embodying two operating units, each having its own raising and lowering cylinder unit, under the control of a main tractor-carried valve unit and arranged when once set in operation, either in the raising direction or in the lowering direction, to move through a given distance and then automatically stop. The position in which movement of the cylinder unit is automatically terminated may be adjusted by changing the position of either or both of the stop collars 225 and 226. It is to be noted that in this form of the invention when the plowing unit is to be lowered into operating position, its operating position is automatically determined by the position of the stop collar 225. If desired, a pair of units, each constructed as indicated in Figure 13, could be employed for controlling two operating units other than a pair of two-way plow bottoms. It will be noted at this point that the position of the stop collar 225 on the associated rod 218 serves to determine the position at which the lowering movement is automatically terminated. For example, a pair of units as shown in Figure 13 could be connected with the right and left hand cultivating units of a two-row tractor mounted cultivator, in which case the outfit would be particularly adapted for use with point rows, since either or both of the cultivator rigs could be raised or lowered simultaneously or individually, as conditions might require.

Another form of the invention, similar to that just described, is shown in Figures 14 and 15. In this form, mechanism is provided on the cylinder and piston unit for adjusting the position in which the movement of the piston section is automatically terminated when the operating unit reaches the desired lowered position. Referring now to these figures, a piston and cylinder unit 240 is mounted in substantially the same way as is indicated in Figures 1, 2 and 13, namely, between a bracket 241 and an arm 242 fixed to a rock shaft or rock shaft section 243 which is connected with an agricultural implement unit of any desired construction, it being understood that there are separately movable units at opposite sides of the tractor and that there are two piston and cylinder units 240. In each unit 240, the cylinder section 244 thereof is pivoted, as at 245, to the bracket 241. Carried on the sleeve section 246 of the unit 240 is a sector 247 to which is pivoted, as at 248, a hand lever 249. The latter carries suitable detent mechanism engageable with the sector 247 in different positions, and the lever 249 also includes a part 251 through which a rod 252 is extended. The end of the rod 252 is adapted to cooperate with a controlling valve best shown in Figure 15.

Referring now to Figure 15, in which the controlling valve is indicated in its entirety by the reference numeral 255, the valve includes a valve body 256 having an annular internal chamber 257 in which a valve seat 258 is formed at one end and which communicates through a bore 259 with a hose or fluid conduit 260 leading to a two-way valve, such as the one shown in Figures 6, 7 and 8. The valve 255 is mounted on one end of the cylinder 244 of the ram unit 240 by a suitable connection 263, which communicates with the interior chamber 257 through a bore 264. Disposed in the bore 259 is a spring 266 the outer end of which bears against a shoulder 267 and the inner end of which bears against a shiftable valve member 269 which is hollow and which has conical valve surfaces 271 and 272 at its opposite ends. The conical surface 271 cooperates with the valve seat 258 to close off communication between the chamber 257 and the bore 259, as will be described below.

The valve member 269 is of generally tubular construction, and disposed within the member 269 is a spring 274, the outer end of which bears against the inner end of a valve actuating stem 275. The valve member 269 is movable within a bushing 276, which in part defines the chamber 257, and the inner end of the bushing 276 seats against a number of lugs 277 which thus support the bushing 276 but provides for fluid flow from the bore 259 into the chamber 257 and vice versa. The bushing 276 has a flanged head 281 which seats against a shoulder 282 and is held in place by a threaded member 283. Packing 284 is carried by the latter and disposed about the valve stem 275. The latter member is provided with a reduced portion 286 about which a gland nut 287 is disposed, the latter member having a shoulder 289 engaging the reduced end 286 of the valve stem 275 and limiting its outward movement. The flanged end 281 of the member 276 is provided with a valve seat 291 with which the conical surface 272 of the valve 269 cooperates.

The operation of this form of the invention is substantially as follows.

Assume that the two cylinder and piston units 240 as just described are associated with, for example, a pair of two-way plow units such as those shown in Figures 1 and 2, and that it is desired to lower one into operating position while holding the other in a raised position, both being held in raised position when turning at the end of the field. In order to lower one of the units, the operator turns the handle of the two-way valve unit, which is not shown in Figures 14 and 15 but which may be assumed to be the same as is shown in Figures 1 and 6–8, to select the piston and cylinder unit 240 of the plow that it is desired to lower. The springs 266 and 274 are so arranged that normally the valve 269 is spaced away from the valve seat 258. Therefore, as soon as the operator turns the handle of the two-way valve unit into the proper position and then manipulates the valve handle of the tractor valve unit so as to provide for fluid flow back to the latter, the plow unit lowers by its own weight, aided if necessary by the operator grasping the lever 122. The piston section 246 moves inwardly of the cylinder of the unit 240 and forces the fluid out through the valve 255 back to the tractor main valve unit. As the piston of the unit 240 thus moves toward the inner end of the cylinder, the end of the rod 252 comes up against the outer end 286 of the valve stem 275. Continued movement then forces the valve stem inwardly, compressing the spring 274 until it exerts a force sufficient to overcome the spring 267, at which time the valve member 269 will be closed against the seat 258, being moved to the left as viewed in Figure 15. This immediately terminates the lowering movement of the plow, the parts being adjusted so that this movement defines the desired lowered position of the plow. Since the hand lever 249 is adjustable along the sector 247, it will be seen that the position of the handle 249 determines the position in which the valve 255 is automatically closed, thereby furnishing a convenient way by which the operator may easily and quickly vary the position in which the movement of the implement unit is automatically terminated. Due to the fact that the valve 269 is held against the seat 258, as just described, by a spring 274, whenever it is desired to raise the plow, all that the operator has to do is to operate the main tractor valve unit and force fluid back to the cylinder past the valve 269, which in this case serves as a check valve, the valve 269 opening against the pressure of the spring 274 even though the rod 252 is against the outer end of the stem 275. Of course, as soon as the piston moves outwardly a slight amount, the pressure of the rod 252 against the valve stem 275 is removed, whereupon the spring 266 serves to hold the valve 269 open and, acting through the spring 274, serves to return the valve stem 275 to its outer position. It will be observed from Figure 15 that the outward movement of the valve 269 by the spring 267 brings the end 272 up against the seat 291. The purpose of this arrangement is to provide a fluid-tight joint independent of the packing 284, whereby the latter need not be drawn up tight enough to interfere with the outward return of the stem 275 by the springs 267 and 274.

While the form of the invention shown in Figures 14 and 15 has been described above as associated with a pair of two-way plowing units, such as those shown in Figures 1 and 2, it will be understood that this form of the invention is not necessarily limited to two-way plows. For example, a pair of cylinder and valve units as just described may be provided for controlling a pair of cultivator rigs at opposite sides of the tractor whereby the raising and lowering of the rigs may be independently controlled. If independent control is not required the same valve and piston units may be employed, thereby providing an automatic stop, individually adjustable, for each unit, but the two-way valve may be eliminated if it is not desired to provide for individual raising movement. In other words, with the cylinder and valve mechanism as shown in Figures 14 and 15 but without a two-way valve, both of the cylinder units may be extended at any time desired by opening the main valve unit 137, and both units may be lowered by operating the valve unit 137, but the lowered position of each unit will be automatically determined by the setting of the individual hand lever 249.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. An agricultural machine comprising supporting means, tool means, longitudinally shiftable means connected for generally fore and aft movement with said supporting means and pivotally connected with said tool means, substantially inextensible connecting means connected between said supporting means and said tool means at a point above the pivotal connection between said tool means and said longitudinal shiftable means, whereby longitudinal movement of the shiftable means adjusts said tool means so as to tend to cause it to change its depth of operation, and means on the supporting means for raising said tool means.

2. A two-way plow comprising supporting means, right and left hand plowing units, a pair of generally vertically spaced and generally longitudinally extending links connecting each unit with said supporting means for movement relative thereto, means for shifting the lower link of each pair of links generally longitudinally to regulate the depth of plowing of the associated unit, and means engageable with the upper link of each unit for raising either or both units out of ground engaging position.

3. A two-way plow comprising supporting means, a pair of right and left hand plowing units connected for relative vertical movement one with respect to the other, means for holding said units against lateral displacement one with respect to the other, draft transmitting means connecting both of said units with said supporting means and accommodating lateral shifting movement of both of said units with respect to said supporting means, and means connected with said supporting means and engageable with the plowing unit in raised position for determining the lateral position of the companion plowing unit in lowered operating position.

4. A two-way plow comprising supporting means, generally longitudinally extending draft transmitting means connected with said supporting means for generally lateral movement relative thereto, a cross bar connected with said laterally swingable draft transmitting means, a pair of right and left hand plowing units pivoted for vertical movement to said cross bar but held by the latter against lateral displacement one with respect to the other, raising means on said supporting means for raising either unit into nonoperating position independently of the position of the other unit, and means associated with each raising means and acting against the unit in raised position and through said cross bar for determining the lateral position of the unit in operating position.

5. In an agricultural implement, a pair of implement units adapted to be raised and lowered selectively, a pair of hydraulically operated ram units connected with said implement units, respectively, a single source of fluid pressure, an automatic cut-off valve associated with each ram unit and responsive to the movement of the implement unit into a lowered position for cutting off the flow of fluid from said source to said unit, and a two-way valve connected in series between said cut-off valves and said single source of pressure for selecting one or the other of said implement units and the associated cut-off valve.

6. A two-way plow comprising supporting means, generally longitudinally extending draft transmitting link means connected at the forward end thereof to said supporting means, a pair of right and left hand plowing units connected with the rear portion of said draft transmitting link means and vertically movable one with respect to the other, means acting between said plowing units for holding them against lateral displacement one with respect to the other, a pair of lifting members mounted on said supporting means and respectively engageable with said units for raising either or both of them into raised position, and means associated with each of said lifting members for determining the lateral position of both of said units relative to said supporting means.

7. A two-way plow comprising supporting means, a pair of draft transmitting links, a cross bar connected to the rear ends of said links and adapted to be raised and lowered relative to said supporting means, a pair of right and left hand plowing units connected with said cross bar, means connecting said units with said supporting means whereby longitudinal movement of said links and said cross bar acts to tilt the forward portions of said units upwardly or downwardly, means on said supporting means connected with the forward ends of said draft transmitting links for shifting the latter generally longitudinally to adjust the depth of operation of said units, means for raising either unit into inoperative position, and means actuated by said raising means and connected with said cross bar for automatically raising or lowering the latter so as to level the unit that is left in lowered or operating position.

8. A tractor mounted two-way plow comprising a pair of right and left hand plowing units connected with the tractor for alternate operation, means for raising and lowering said units, means operated by said raising and lowering means for tilting said units laterally, and adjustable means for adjusting the amount of tilt for any given amount of movement of said raising and lowering means, said adjustable means being movable from a position of substantially no tilt to a position of maximum tilt.

9. A tractor mounted two-way plow comprising a pair of right and left hand plowing units, generally longitudinally extending draft link means connected at its forward end with the forward portion of the tractor, a cross bar connected to the rear end of said draft transmitting link means, said plowing units being connected for vertical swinging movement with said cross bar, a pair of rock shafts mounted on the rear of the tractor for independent rocking movement, each having a lifting arm thereon connected with the associated plowing units, a member adjustably mounted on each lifting arm, a pair of links connected at their lower ends with said cross bar and at their upper ends to said adjustable members, each of the latter being adjustable to vary the position of the point of connection of the upper end of each link to the associated member relative to the axis of rocking movement of the associated rock shaft, movement of either rock shaft from lifted position to lowered position acting through the associated link for lowering that end of the cross bar, thereby tilting the associated plowing unit to accommodate one wheel of the tractor running in a furrow, and separate means connected with each rock shaft for rocking the latter between raised and lowered positions.

10. A tractor mounted two-way plow as defined in claim 9, further characterized by said adjustable members being adapted to be fixed in a position with the points of connection of the links therewith relatively close to the axis of rocking movement of the associated rock shaft, respectively, whereby the plow is adapted for hillside work where one wheel of the tractor runs in the furrow on the uphill side.

11. An agricultural implement adapted to be connected with a tractor, comprising ground working tool means, a generally horizontally disposed link generally vertically and laterally swingable and connecting said tool means with the tractor for generally vertical and lateral movement relative to the latter, arm means on the tractor and movable into a position out of contact with said generally horizontally disposed link to accommodate lateral movement of said tool means relative to the tractor and into a position engaging said link for raising the tool means into transport position, and means on said arm means including at least one upwardly angled surface adapted to engage said link when the tool means is to be raised for controlling the lateral position of said tool means relative to the tractor.

12. A two-way plow comprising supporting means, right and left hand plowing units, a pair of generally vertically spaced and generally longitudinally extending links pivotally connected at generally vertically spaced points with each unit and serving to connect the latter with said supporting means for movement relative thereto, means for shifting the lower link of each pair of links generally longitudinally to regulate the depth of plowing of the associated unit, and means connected with the upper link of each pair for raising the associated unit into a transport position.

13. An agricultural machine comprising supporting means, tool means, a pair of generally vertically spaced and generally longitudinally extending links pivotally connected at generally vertically spaced points with said tool means and serving to connect the latter with said supporting means for movement relative thereto, means for shifting the lower link for regulating the depth of operation of said tool means, and means connected with the upper link for raising the tool means into a transport position.

14. A two-way plow comprising supporting means, right and left hand plowing units, a pair of generally vertically spaced and generally longitudinally extending links connected at their forward ends with said supporting means, and swingable laterally relative to the latter, a cross bar connected to the rear ends of said links, means connecting both of said plowing units with said cross bar so as to prevent lateral movement of either relative to the cross bar, whereby both of said plowing units swing laterally together with said cross bar and said links, and means engageable with one of said units and acting through said cross bar for limiting the lateral movement of both of said units.

15. In an agricultural implement, a pair of implement units adapted to be raised and lowered selectively, a pair of hydraulically operated ram units connected with said implement units, respectively, a single source of fluid pressure, valve means for controlling the flow of fluid to and from said source, an automatic cut-off valve associated with each ram unit and responsive to the movement of the implement unit into a lowered position for cutting off the flow of fluid from said source to said unit, and a two-way valve connected between said cut-off valves and said single source of pressure for selecting one or the other of said implement units and the associated cut-off valve, each cut-off valve being normally held in a position providing for a flow of fluid to and from the associated ram unit under the control of said valve means.

16. The invention as set forth in claim 15, further characterized by each of said cut-off valves having a valve port communicating with the associated ram unit, a valve member movable to close said port, and biased means for holding said valve in normally open position.

17. The invention as set forth in claim 15, further characterized by each of said cut-off valves having a valve port communicating with the associated ram unit, a valve member movable to close said port, biased means for holding said valve in normally open position, means including yielding means adapted to overcome said biased means for moving said valve member into a position closing said port when the associated implement unit reaches its lowered position, said yielding means permitting said valve member to open to admit fluid to the associated ram unit when said valve means is opened.

18. In an agricultural implement having an implement part to be shifted, a piston and cylinder unit for shifting said part in one direction, a source of fluid under pressure for operating said unit, a valve, and yielding means actuated by movement of said implement part into one position from another position for moving said valve into a closed position preventing further flow of fluid from said unit toward said source, said yielding means permitting a flow of fluid from said source to said unit while said implement part is in said one position so as to move said implement out of said one position back toward said other position.

19. In an agricultural implement having a part to be shifted, a ram unit having a movable part connected with said implement part, a source of fluid under pressure, valve means adapted to shut the flow of fluid between said ram unit and said source, and means including a spring connecting said movable part and said valve means for closing the latter when said implement part reaches a given position in response to a flow of fluid out of said unit, said spring accommodating the opening of said valve means to provide for fluid flowing into said ram unit while said movable part is in a closed position so as to provide for shifting said implement part out of said given position.

20. In an agricultural implement having a part to be shifted, a control valve for a ram unit or the like operatively connected with said implement part and adapted to be operated by a source of fluid pressure, comprising a valve chamber having a port adapted to be placed in communication with said source of fluid pressure, a valve member movable in said chamber for opening and closing said port, a first spring for yieldingly holding said valve member away from said port, a movable operating part extending into said chamber and connected to be moved by said implement part, and a second spring between said part and said valve member whereby movement of said operating part into one position acts through said second spring to close said valve member, said second spring being adapted to yield to permit said valve member to open under pressure of fluid from said source while said operating part is in said one position.

21. In a tractor mounted plow, a plow beam, a draft connection extending generally longitudinally from the beam to the tractor, link means swingable generally in a fore and aft direction for supporting the front end of said beam on the tractor, a plow bottom pivoted to the rear end of said beam and having an upwardly extending part, means providing for generally fore and aft movement of said longitudinal draft connection and the associated plow beam and bottom, and a generally longitudinally extending substantially inextensible connection between the upper end of said part and the tractor, whereby longitudinal movement of said beam adjusts said bottom by swinging the latter about its pivot connection with said beam.

22. In a tractor mounted plow, a plow beam, a draft connection extending generally longitudinally from the front end of said beam to the front end of the tractor, a plow bottom on said beam, means on the tractor for shifting said draft connection generally longitudinally, a longitudinal link connected at its forward end with the tractor and at its rear end with said plow beam, and means acting against the link for raising and lowering said plow bottom and the rear end of said longitudinal draft connection.

23. In a tractor mounted implement, generally longitudinally shiftable draft means connecting the implement with the tractor, means on the tractor for shifting said draft means and said implement longitudinally of the tractor, means acting generally against the draft means for raising or lowering the implement, and means responsive to longitudinal movement of the draft means and implement relative to the tractor for actuating said raising or lowering means so as to adjust the position of said implement.

WALTER H. SILVER.